(12) United States Patent
Hiller

(10) Patent No.: US 10,894,534 B2
(45) Date of Patent: Jan. 19, 2021

(54) TRAILER BRAKE SYSTEM

(71) Applicant: Continental Automotive Systems, Inc., Auburn Hills, MI (US)

(72) Inventor: Ralf Hiller, Mainz (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/892,697

(22) Filed: Feb. 9, 2018

(65) Prior Publication Data

US 2019/0337499 A1 Nov. 7, 2019

Related U.S. Application Data

(60) Provisional application No. 62/513,550, filed on Jun. 1, 2017, provisional application No. 62/457,994, filed on Feb. 12, 2017.

(51) Int. Cl.

| | |
|---|---|
| *B60T 8/34* | (2006.01) |
| *B60T 8/171* | (2006.01) |
| *B60T 8/172* | (2006.01) |
| *B60T 8/176* | (2006.01) |
| *B60T 13/16* | (2006.01) |
| *B60T 8/32* | (2006.01) |

(52) U.S. Cl.
CPC ............... *B60T 8/34* (2013.01); *B60T 8/171* (2013.01); *B60T 8/172* (2013.01); *B60T 8/176* (2013.01); *B60T 8/326* (2013.01); *B60T 13/16* (2013.01); *B60T 2201/06* (2013.01); *B60T 2240/00* (2013.01); *B60T 2250/00* (2013.01); *B60T 2270/10* (2013.01); *B60T 2270/30* (2013.01)

(58) Field of Classification Search
CPC . B60T 8/34; B60T 8/171; B60T 8/172; B60T 8/176; B60T 8/326; B60T 13/16; B60T 2201/06; B60T 2240/00; B60T 2250/00; B60T 2270/10; B60T 2270/30
See application file for complete search history.

(56) References Cited

U.S. PATENT DOCUMENTS

| | | | | |
|---|---|---|---|---|
| 2014/0149011 | A1* | 5/2014 | Eberling | B60T 8/1708 701/70 |
| 2014/0343813 | A1* | 11/2014 | Morselli | B60T 13/08 701/70 |
| 2016/0121870 | A1* | 5/2016 | Bennett | B60T 8/176 701/71 |
| 2016/0152216 | A1* | 6/2016 | Spath | B60T 8/171 701/70 |
| 2017/0259794 | A1* | 9/2017 | Binder | B60T 8/72 |

* cited by examiner

*Primary Examiner* — Melanie Torres Williams

(57) ABSTRACT

The disclosure provides a trailer brake system that includes a sensor system and a brake control unit. The sensor system is supported by a trailer and includes at least one wheel speed sensor associated with each wheel of the trailer. The brake control unit is supported by the trailer and is in communication with a tow vehicle configured to tow the trailer. The brake control unit is configured to: receive sensor data from the sensor system, and receive a brake signal from the tow vehicle indicative of a driver pressing a brake pedal of the tow vehicle. The brake control unit is also configured to: determine, for each brake, a hydraulic pressure based on the sensor data and the brake signal; and apply pressure by way of brake lines to the brake associated with each wheel, based on the hydraulic pressure.

14 Claims, 9 Drawing Sheets

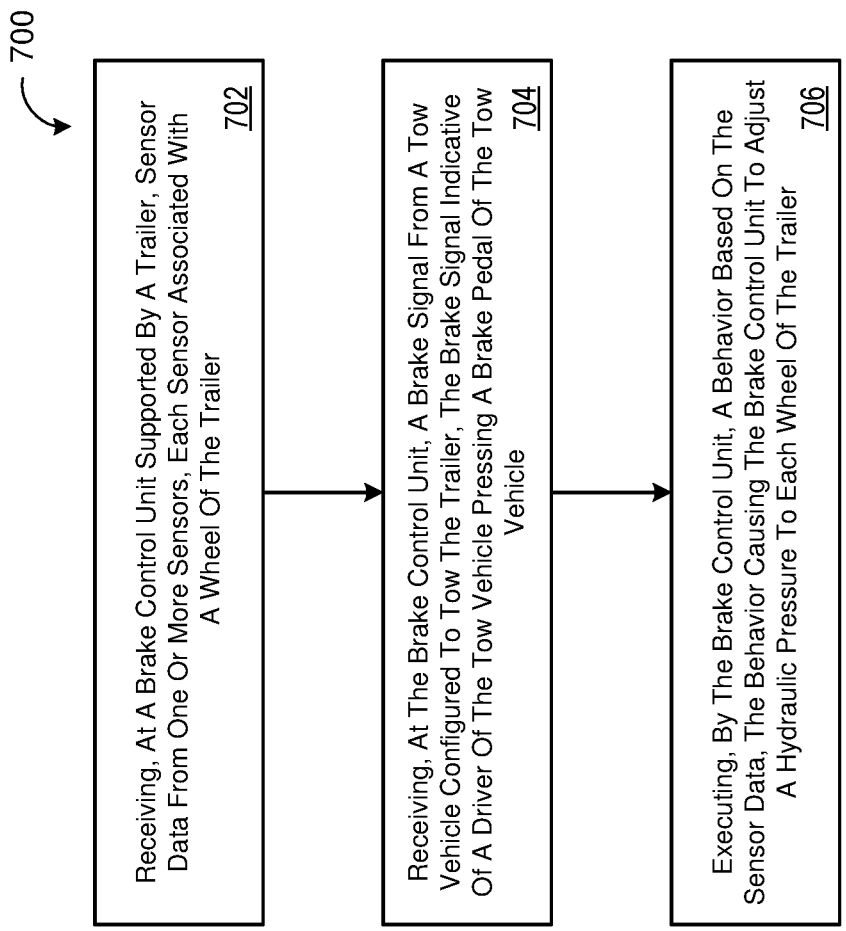

TRAILER BRAKE SYSTEM

CROSS REFERENCE TO RELATED APPLICATIONS

This U.S. patent application claims priority under 35 U.S.C. § 119(e) to U.S. Provisional Application 62/457,994, filed on Feb. 12, 2017, and U.S. Provisional Application 62/513,550, filed on Jun. 1, 2017 which are hereby incorporated by reference in its entirety.

TECHNICAL FIELD

This disclosure relates to a trailer brake system that provides the trailer with anti-lock braking (ABS) and electronic stability control (ESC).

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

A tow vehicle hitched to a trailer while traveling at a normal speed needs a lot of power to bring the massive weight of the tow vehicle and the trailer that it is towing to a complete stop. Therefore, often times, the trailer may need separate brakes that are associated with its wheels because the brakes of the tow vehicle are not enough to stop both the tow vehicle and the trailer.

There are two main types of trailer brake systems: electric brake system and electric over hydraulic brake system. The electric brake system includes electric brakes that are installed on the wheels of the trailer. A brake controller is provided in the tow vehicle and in some examples, the brake controller is connected to the tow vehicle's wiring system (i.e., electrical system). When a driver pushes a pedal brake of the tow vehicle, the brake controller (in communication with the pedal brake) sends a brake signal to the trailer, causing the trailer brakes to brake. In this case, the electric brake includes a magnet, a brake drum, and brake shoes surrounding the brake drum. When the brake controller sends the brake signal to the trailer, the magnet inside the brake drum pulls the brake shoes toward the drum, causing the brakes to actuate. Electric brakes only work with drum brakes and the driver of the tow vehicle is responsible for adjusting the brake controller correctly to accommodate for the trailer, road, and weather conditions. For example, the driver adjusts the brake controller based on whether the trailer is empty or loaded, whether the road is dry, wet, and/or icy, and whether it is raining or snowy. Other considerations may also be made for adjusting the brake controller. In some examples, the driver adjusts a gain on the brake controller. The heavier the trailer, the higher the driver has to adjust the gain. While the lighter the trailer, the lower the driver has to adjust the gain. The electric brakes include a trailer mounted car battery, which is configured to supply power to the brakes when the trailer separates from the tow truck, allowing the trailer to stop.

Similar to the electric brake system, the electric over hydraulic brake system also uses a brake controller that sends a brake signal from the tow vehicle to the trailer. However, in this case, brake pressure is generated by way of a trailer mounted hydraulic pump. The hydraulic pressure is distributed by brake lines to individual wheels of the trailer. As such, the electric over hydraulic brake system generates more brake pressure (than the electric brake system), and can use disc brakes (instead of only using drum brakes as used in the electric brake system). The electric over hydraulic brake system is mainly used on heavy trailers. In addition, the trailer includes a battery used to power the hydraulic pump, which may also be used to apply the brakes when the trailer accidentally disconnects from the tow vehicle. This system also relies on the driver to adjust the brake controller based on whether the trailer is empty or loaded, the road is dry, wet, and/or icy, and if it is raining or snowy Both the electric brake system and the electric over hydraulic brake system are commonly used systems. However, both systems have drawbacks, specifically because the driver has to adjust the brake controller based on the weight of the trailer, the road conditions, and the weather. If the driver has a fully loaded trailer and forgets to adjust the brake controller by adding enough gain, the driver will mostly rely on the tow vehicle brakes to stop both the tow vehicle and the trailer, which overworks the brakes of the tow vehicle. In some examples, the trailer may be over 30,000 lbs. If the trailer brakes are adjusted to a large load and the driver forgets to lower the gain after unloading the trailer, the driver may risk over braking the trailer, which may lead to the driver losing control of the tow vehicle and the trailer.

SUMMARY

One aspect of the disclosure provides a trailer brake system that includes a sensor system and a brake control unit. The sensor system is supported by a trailer and includes at least one wheel speed sensor associated with each wheel of the trailer. The brake control unit is supported by the trailer and is in communication with a tow vehicle configured to tow the trailer. The brake control unit is configured to: receive sensor data from the sensor system, and receive a brake signal from the tow vehicle indicative of a driver pressing a brake pedal of the tow vehicle. The brake control unit is also configured to: determine, for each brake, a hydraulic pressure based on the sensor data and the brake signal; and apply pressure by way of brake lines to the brake associated with each wheel, based on the hydraulic pressure.

Implementations of this aspect of the disclosure may include one or more of the following optional features. In some implementations, the trailer brake system further includes a first connector having a first end releasably connected to the tow vehicle and a second end releasably connected to the trailer. The first connector transmits the brake signal to the brake control unit. The trailer brake system may further include a second connector having a first end releasably connected to the tow vehicle and a second end releasably connected to the trailer. The second connector is configured to link a brake system of the tow vehicle and the brake control unit of the trailer, causing the brake system of the tow vehicle and the brake control unit to execute the same behaviors.

In some implementations, the brake control unit executes a behavior before applying pressure by way of the brake lines to the brake associated with each wheel. The behavior determining a pressure value applied to each brake. In some examples, the behavior includes one or more of a braking behavior, an anti-lock behavior, an electronic stability control behavior, a hill-start assist behavior, and a hill-hold assist behavior. The sensor data received from the sensor system may includes at least one of speed sensor data associated with each wheel, wheel travel data associated with each wheel, trailer distance from a surface.

In some examples, the brake control unit includes a hydraulic pump configured to apply pressure by way of the brake line to the brakes associated with each wheel. Additionally, the brake control unit includes a hydraulic and electric control unit in communication with the hydraulic pump and the sensor system and having a computing processor processing data received from the sensor system. The hydraulic and electric control unit determines the hydraulic pressure for each brake.

Another aspect of the disclosure provides a method for controlling a trailer brake system. The method includes receiving, at a brake control unit supported by a trailer, sensor data from one or more sensors. Each sensor is associated with a wheel of the trailer. The method also includes receiving, at the brake control unit, a brake signal from a tow vehicle configured to tow the trailer. The brake signal is indicative of a driver of the tow vehicle pressing a brake pedal of the tow vehicle. The method also includes executing, by the brake control unit, a behavior based on the sensor data. The behavior causing the brake control unit to adjust a hydraulic pressure to each wheel of the trailer.

Implementations of this aspect of the disclosure may include one or more of the following optional features. In some implementations, the method further includes receiving, at the brake control unit, tow vehicle data, and transmitting, from the brake control unit to the tow vehicle, trailer data. Receiving tow vehicle data and transmitting trailer data causes the tow vehicle and the trailer to act as a braking system, e.g., pressing the brake pedal of the tow vehicle results in the same behavior executed on the tow vehicle and the trailer. In some examples, the behavior includes one or more of a braking behavior, an anti-lock behavior, an electronic stability control behavior, a hill-start assist behavior, and a hill-hold assist behavior. Each behavior determining a pressure value applied to each brake. In some example, the sensor data received from one or more sensors includes at least one of speed sensor data associated with each wheel, wheel travel data associated with each wheel, trailer distance from a surface.

In some implementations, executing the behavior based on the sensor data, includes: determining for each brake, a hydraulic pressure based on the sensor data and the brake signal, and applying hydraulic pressure by way of brake lines to the brake associated with each wheel, based on the hydraulic pressure.

Yet another aspect of the disclosure provides a trailer brake system that includes a sensor system disposed on a trailer having wheels. The sensor system includes at least one wheel speed sensor associated with a wheel of the trailer. The trailer brake system also includes a hydraulic pump supported by the trailer and configured to apply pressure by way of a brake line to a brake associated with each one of the wheels when receiving a brake signal from a tow vehicle in communication with the hydraulic pump. The trailer brake system also includes a hydraulic and electric control unit in communication with the hydraulic pump and the sensor system and having a computing processor processing data received from the sensor system. The hydraulic and electric control unit determines a hydraulic pressure applied to each brake based on data received from the sensor system when the hydraulic pump receives the brake signal.

Implementations of this aspect of the disclosure may include one or more of the following optional features. In some implementations, the trailer brake system further includes a first connector having a first end releasably connected to the tow vehicle and a second end releasably connected to the trailer. The first connector transmits a brake signal to the trailer. The trailer brake system may further include a second connector having a first end releasably connected to the tow vehicle and a second end releasably connected to the trailer. The second connector configured to link a brake system of the tow vehicle and the hydraulic and electric control unit of the trailer. In some examples, the hydraulic pump receives the brake signal from the tow vehicle causing the hydraulic pump to apply pressure by way of the brake line to a brake associated with each one of the wheels. The hydraulic and electric control unit may execute a behavior configured to determine the hydraulic pressure applied to each brake when the hydraulic pump applies pressure by way of brake line to a brake associated with each one of the wheels.

In some implementations, the data received from the sensor system includes at least one of speed sensor data associated with each wheel, wheel travel data associated with each wheel, trailer distance from a surface.

In some examples, the hydraulic and electric control unit is configured to: receive data from the sensor system indicative of a wheel speed associated with each wheel; and execute a behavior based on the wheel speed of each wheel, the behavior being one of a braking behavior, an anti-lock behavior, an electronic stability control behavior, a hill start assist behavior, or a hill hold assist behavior.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a schematic view of an exemplary arrangement of operations for controlling a trailer brake system Like reference symbols in the various drawings indicate like elements.

DETAILED DESCRIPTION

Figure 1:
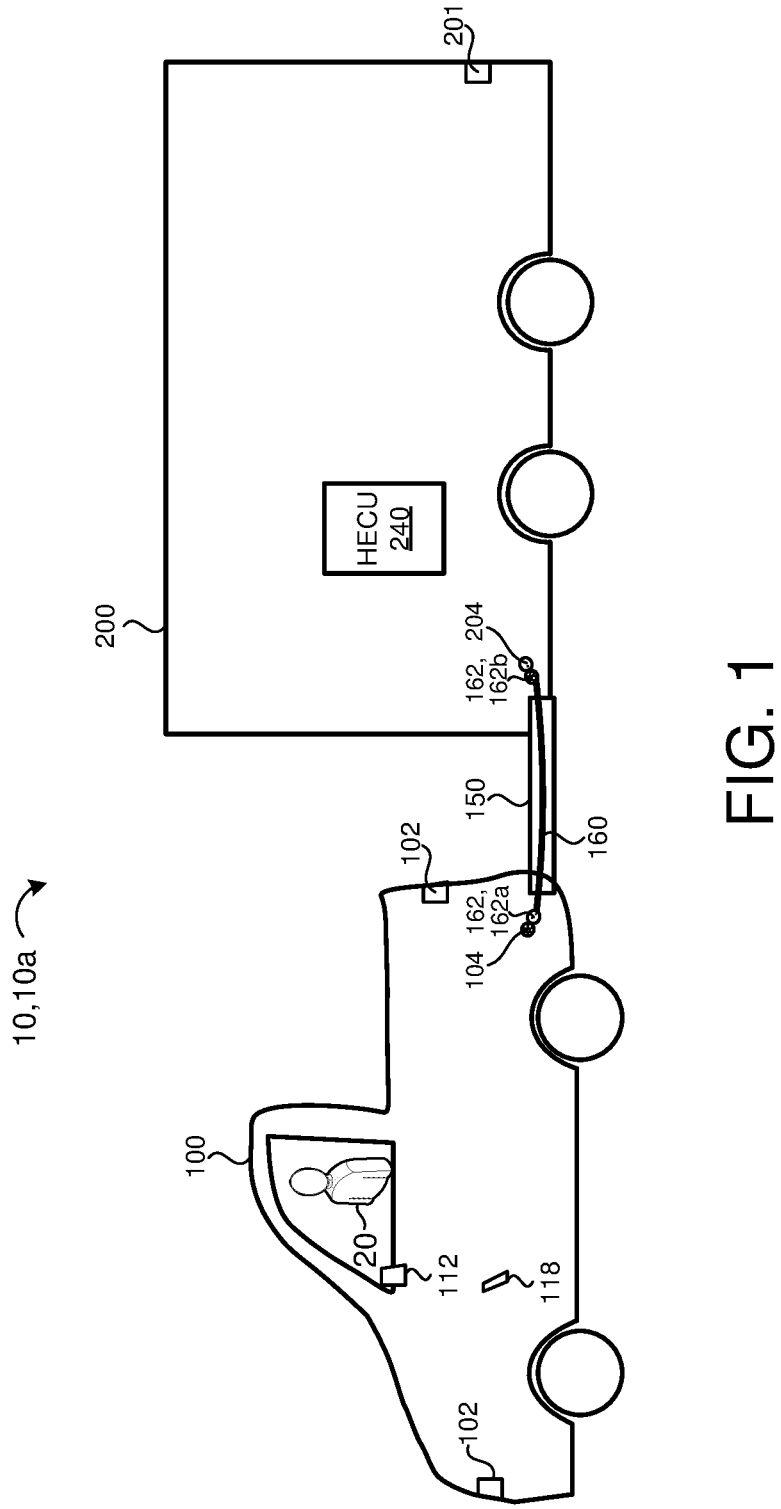
FIG. 1 is a schematic view of an exemplary tow system.

A tow vehicle, such as, but not limited to a car, a crossover, a truck, a van, a sports-utility-vehicle (SUV), a recreational vehicle (RV) may be configured to tow a trailer. The tow vehicle connects to the trailer by way of a trailer hitch. It is desirable to have a trailer brake system that monitors sensors associated with the trailer, and therefore, eliminates the need for a driver to manually adjust a brake controller in the tow vehicle based on the weight/load of the trailer, and weather and road conditions. In addition, it is desirable to have a trailer configured to execute at least one of an anti-lock braking system (ABS), electronic stability control (ESC), hill start assist (HSA), and hill hold assist (HHA), and any other brake behaviors. As such a towing system with such features provides a user with a safer driving experience when driving a tow vehicle attached to a trailer.

Referring to FIGS. 1-6, in some implementations, a tow system 10, 10a, 10b includes a tow vehicle 100 hitched, by way of a trailer hitch system 150, to a trailer 200. In some examples, a receiver hitch 152 mounts on the tow vehicle 100 and connects to a trailer hitch 154 by way of a connector 156. The connector 156 may be a ball and socket, a fifth wheel and gooseneck, or a trailer jack. Other connectors 156 may also be used.

Figure 2:
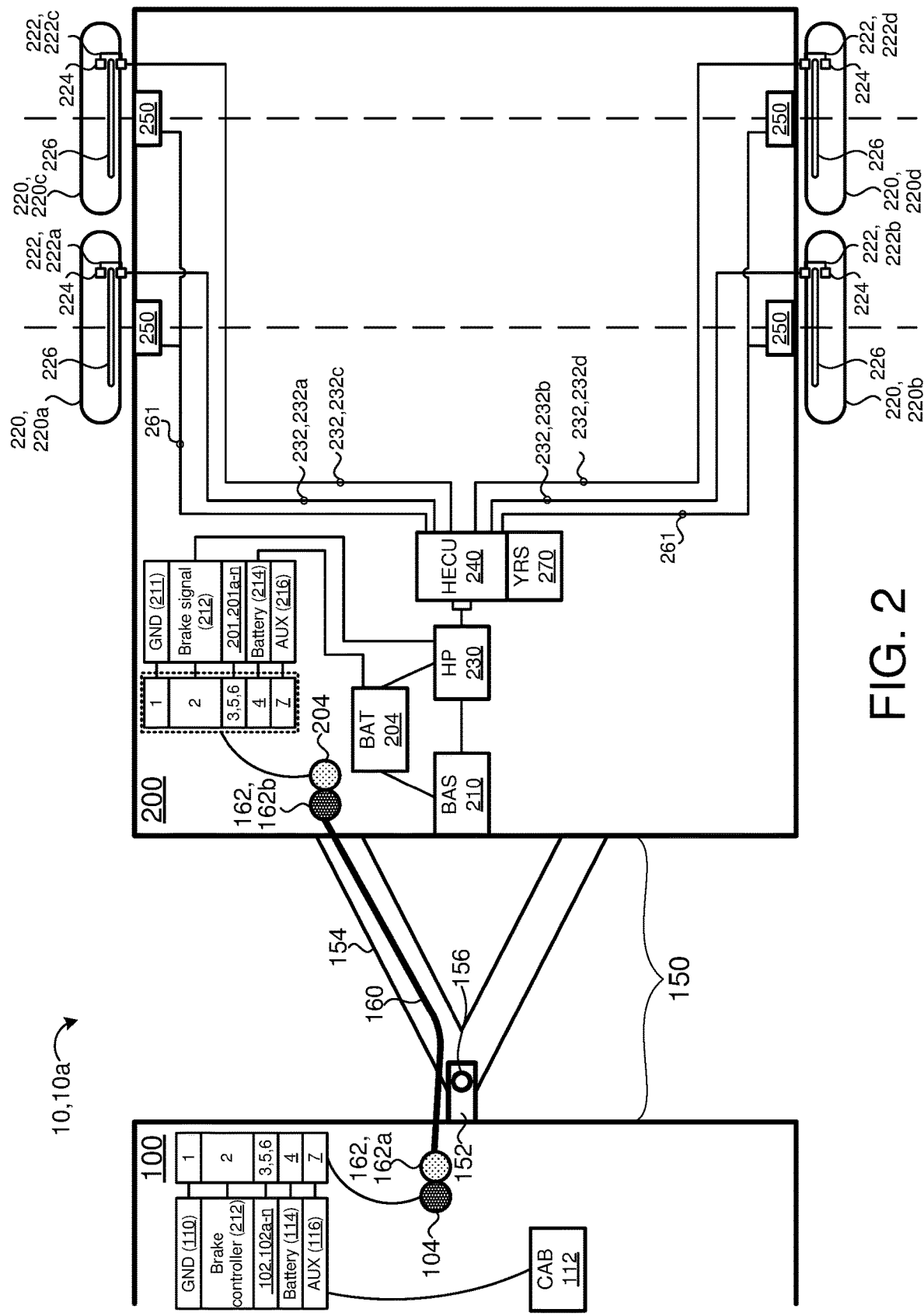
FIG. 2 is a schematic view of the exemplary tow system of FIG. 1 showing a connector between a tow vehicle and a trailer.
Figure 3:
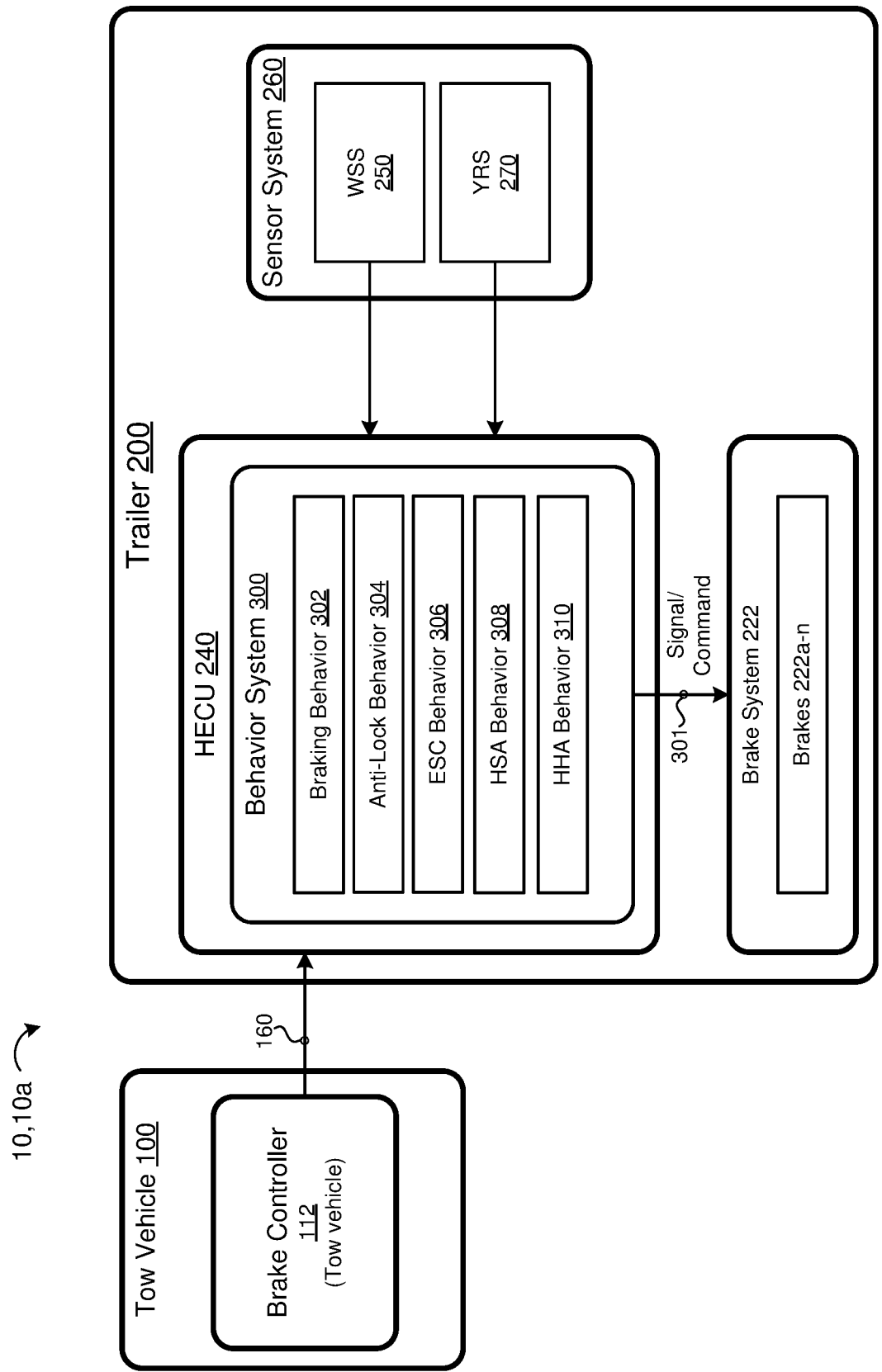
FIG. 3 is a schematic view of an electronic hydraulic and electronic control unit of the tow system of FIG. 1.

Referring to FIG. 2, in some examples, the trailer 200 includes a trailer battery 202, a brake away switch (BAS) 210, a hydraulic pump 230, and a hydraulic electronic control unit (HECU) 240. In addition, the trailer 200 includes a sensor system 260 that includes wheel speed sensors (WSS) 250 associated with each wheel 220 of the trailer 200, and a yaw-rate sensor (YRS) 270 that may be a standalone sensor or part of the HECU 240, as shown in FIGS. 2 and 3. The sensor system 260 may include other sensors, such as, but not limited to a load sensor, a height sensor, or any other sensor. This allows the trailer 200 to slow down or stop independently from the tow vehicle 100. As such, the trailer 200 determines how to brake based on a received signal from the tow vehicle 100 indicating that the tow vehicle 100 is braking.

The trailer battery 202 is configured to power the BAS 210 and the hydraulic pump 230. However, the trailer battery 202 may be used to power other modules as well.

The BAS 210 is configured to stop the trailer 200 from moving when the trailer 200 is accidentally disconnected from the tow vehicle 100. As such, when the trailer 200 disconnects from the tow vehicle 100, the BAS 210 sends a signal to the hydraulic pump 230, causing the hydraulic pump 230 to apply brake pressure to the wheel cylinders (one on each trailer wheel), which leads to the trailer 200 stopping.

As shown, the brake system 222 of the trailer 200 is an electric over hydraulic brake system. As such, the trailer 200 includes the hydraulic pump 230 that generates pressure transmitted through the HECU 240 to the wheels 220a-220d by way of brake lines 232. Each brake line 232, 232a-232d connects (through the HECU 240, discussed below) the hydraulic pump 230 to each individual wheel 220a-220d respectively. The brake lines 232, 232a-232d transfer hydraulic pressure from the hydraulic pump 230 to each individual wheel 220a-220d respectively. For example, a first brake line 232a connects the hydraulic pump 230 to a first wheel 230a positioned on the front-right side of the trailer 200, a second brake line 232b connects the hydraulic pump 230 to a second wheel 230b positioned on the front-left side of the trailer 200, a third brake line 232c connects the hydraulic pump 230 to a third wheel 230c positioned on the back-right side of the trailer 200, and a fourth brake line 232d connects the hydraulic pump 230 to a fourth wheel 230d positioned on the back-left side of the trailer 200. In some examples, the trailer 200 includes more wheels 220e-n (not shown). In such case, more brake lines 232e-n are used to connect the hydraulic pump 230 to the respective wheels 220e-n.

In some implementations, the hydraulic pump 230 may be an electrohydraulic brake pump that provides brake pressure much faster than with the conventional hydraulic system. In this case, the trailer 200 may include electric parking brake linked to an electric parking brake of the tow vehicle 100. As such, when the tow system 10 is parked on an incline, the tow system 10 could be held by both the parking breaks of the tow vehicle 100 and the trailer 200, which provides a safer tow system 10 because the tow system 10 uses all the parking brakes of both the trailer 200 and the tow vehicle 100 instead of just using the parking brakes of the tow vehicle 100.

When the driver 20 of the tow vehicle 100 presses a brake pedal 118 located in the tow vehicle 100, the vehicle brake controller 112 sends the trailer 200, more specifically the hydraulic pump 230, a "BRAKE" signal 212. When the hydraulic pump 230 receives the "BRAKE" signal 212, the hydraulic pump 230 is triggered to generate pressure to be distributed to the trailer brakes 222. As shown, the HECU 240 is positioned between the hydraulic pump 230 and the brake lines 232. Therefore, the HECU 240 determines which wheel 220a-220d receives what amount of pressure. Once the pressure is distributed to each wheel 220a-d, the pads 224 of each trailer brake 222 exert pressure on a brake disc 226 associated with the wheel 220a-d causing the trailer 200 to slow down or stop.

The HECU 240 includes a computing processor in communication with non-transitory memory. The HECU 240 (executing instructions stored in the non-transitory memory) may execute a behavior system 300 that cause each one of the brakes 222a-n, 222a-n of the trailer 200, independent of one another, to take an action. In some examples, the behavior system 300 includes a braking behavior 302, an anti-lock behavior 304, an electronic stability control (ESC) behavior 306, a hill-start assist (HSA) behavior 308, and a hill-hold assist (HHA) behavior 310. Other behaviors may be possible as well.

The HECU 240 is configured to monitor the sensor system 260 that includes the wheel speed sensors (WSS) 250 and yaw-rate sensor (YRS) 270. Each WSS 250 is associated with a wheel 220, 220a-d of the trailer 200 to enhance the braking capabilities of the trailer 200 and determine which behavior 302-310 to execute. In some examples, the WSS 250 sends a signal containing raw speed data associated with each wheel 220a-d to the HECU 240, which in turn, the HECU 240 calculates a speed of the trailer 200 by determining an average of the received wheel speed data signals. The WSS 250 measures the revolutions per min (RPM) of each wheel 220. In other words, the WSS 250 reads the speed of an associated wheel 220, 220a-d of the trailer 200. The HECU 240 may enhance the braking capabilities and determine which behavior 302-310 to execute. In other examples, the load of the trailer 200 may be determined from the WSS 250 via an algorithm. This algorithm relates the required brake pressure to the ABS activation. The heavier the trailer 200 is loaded, the more brake pressure may be applied to get into wheel slippage resulting in the activation of the ABS of the trailer 200.

The YRS 270 is a gyroscopic device used for measuring the trailer's angular velocity around its vertical axis (not shown). The YRS 270 is in communication with the HECU 240 and provides the HECU 240 with measurement data that helps the HECU 240 determine when to execute the ESC behavior 306. In some examples, the YRS 270 is part of the HECU 240.

In some examples, the sensor system 260 includes a tire-pressure monitor system (TPMS) having a tire-pressure sensor associated with each tire. The HECU 240 monitors the TPMS and executes a behavior 302-310 based on the received data.

The HECU 240 executes the braking behavior 302 that includes adjusting the pressure 301 from the hydraulic pump 230 to one or more brakes 222, 222*a-d* causing them to stop. The ability of the HECU 240 to control each brake 222, 222*a-d* individually, allows the HECU 240 to execute the anti-lock behavior 304, allowing the HECU 240 and the brakes 222*a-n* to act as an anti-lock braking system (ABS). The anti-lock behavior 304 allows the wheels 220*a-n* on the trailer 200 to maintain tractive contact with a road surface based on how the driver 20 presses the brake pedal 118 of the tow vehicle 100. Therefore, the anti-lock behavior 304 prevents the wheels 220*a-n* of the trailer 200 from locking up, for example, stopping to rotate, and prevents the wheels 220 from skidding. In addition, the anti-lock behavior 304 reduces the brake distance which is the distance from a time the driver presses the brake pedal 118 until the tow system 10 stops or slows down, and the individual brake interventions allows a better stabilization of the tow system 10.

In some examples, the HECU 240 executes the electronic stability control (ESC) behavior 306, which is configured to improve the ability of the trailer 200 to stabilize and track better, especially on slippery surfaces and while turning. By monitoring the WSS 250, the HECU 240 may detect fishtailing. In this case, the HECU 240 executes the ESC behavior 306 that includes adjusting the pressure 301 to one or more brakes 222*a-n* via the brake lines 232, 232*a-d* to help steer the trailer 200 to where the driver 20 of the tow system 10 intends to drive and to stabilize the tow vehicle system 10 including the tow vehicle 100 and the trailer 200.

The hill hold assist (HHA) and hill start assist (HSA) behaviors prevent the trailer 200 from rolling back when positioned on a hill and the driver 20 releases the brake pedal 118 of the tow vehicle 100. In some implementations, the hill start assist (HSA) behavior locks the pressure in the brake 222, 222*a-d* for a maximum of three seconds to help the tow system 10 take off when in an inclined position. The hill hold assist (HHA) behavior may be executed when the trailer 200 includes electric parking brakes. The HHA behavior is executed in instances when the trailer 200 is on the incline for longer than three seconds, which will activate the electric parking brakes to maintain the position of the trailer 200 on the incline.

The HECU 240 may determine when to execute the HSA behavior 308 or the HHA behavior 310 based on receiving a signal 261 (i.e., sensor data) from one of the sensors of the sensor system 260 indicating that the trailer 200 is tilted. In some examples, the trailer 200 may include an incline sensor, a backward motion sensor, and accelerator sensor, or any other sensor that triggers the HECU 240 to execute the HSA and/or the HHA behavior. The HSA and/or the HHA behaviors 308, 310 reduce the strain on the brakes of the tow vehicle 100 and prevent the tow vehicle 100 and the trailer 200 from rolling back when taking off.

In some implementations, the brake lines 232 may be diagonally split or front/rear split. A diagonal split of the brake lines 232 includes one brake line 232 run to each rear brake and one to each front brake. The connections may be such that the left front and the right rear brake are on one circuit and the right front and left rear are on the other circuit. Due to the small axle spacing on a tandem axle trailer, the ESC function is executed based on a pair of wheels 220 (on either side), instead of on individual wheels 220. The ABS may be handled individually on each wheel individual. HSA/HHA work on all trailer brakes simultaneously, i.e., at the same time.

Figure 4:
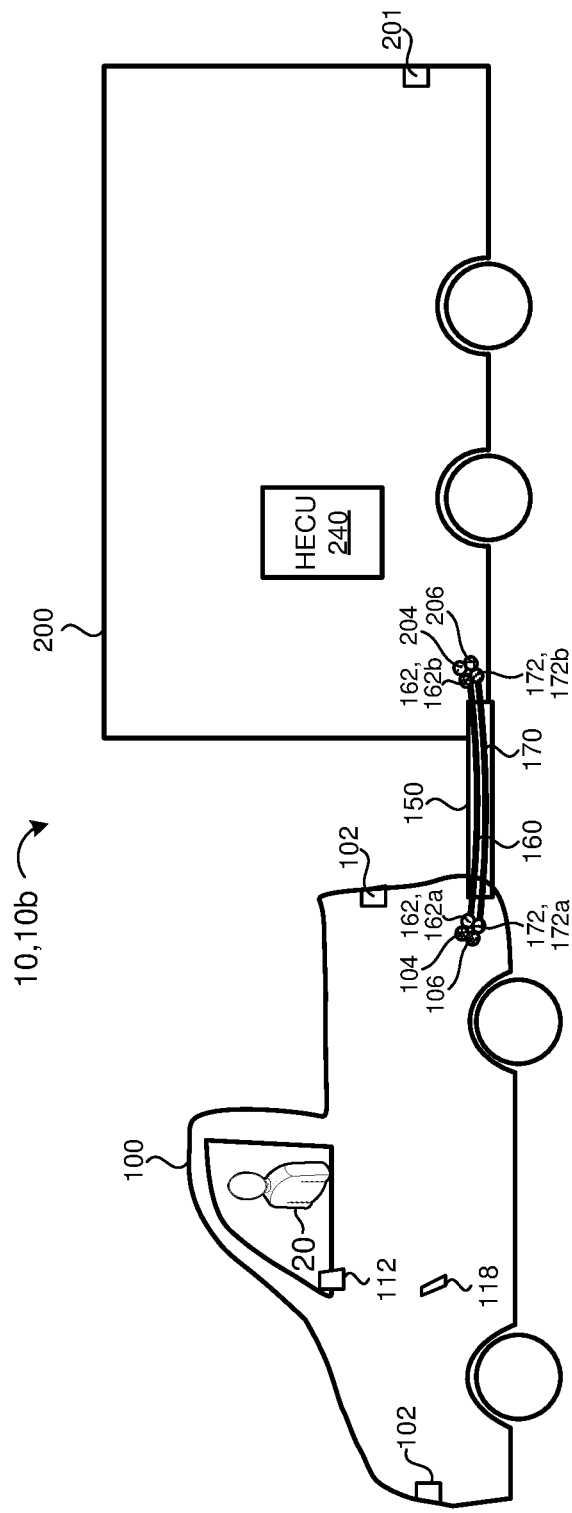
FIG. 4 is a schematic view of an exemplary tow system having two connectors.

The tow vehicle 100 is also in communication with the trailer 200 by way of a first connector 160 (as shown in FIGS. 1-3) and optionally a second connector 170 (as shown in FIGS. 4-6). The first and second connectors 160, 170 may be a multi-pole electrical connector between the tow vehicle 100 and the trailer 200. In some examples, the tow vehicle 100 is configured to receive the first connector 160. In this case, the HECU 240 may execute the behaviors 302-310 and support the functions provided by the behaviors, regardless if the tow vehicle 100 supports similar behaviors. As such, both the tow vehicle 100 and the trailer 200 can execute braking behaviors simultaneously and independently of one another. In other examples, the tow vehicle 100 is configured to receive the first connector 160 and the second connector 170. In this case, the brake system 222 of the tow vehicle 100 may be synchronized with the tow vehicle brake system (not shown). As such, the tow vehicle 100 and the trailer 200 act together to execute a braking behavior that is determined based on the trailer-vehicle 10 as a whole.

Referring to FIGS. 1-3, in some examples, the first connector 160 is configured to supply automotive lighting 201, such as, but not limited to, taillights, turn signals, and brake lights, on the trailer 200. As such, when the driver 20 of the tow vehicle 100 turns his left/right signal on, hits the brake, or turns his lights 102 on, then the trailer 200 also mimics the action of the lights 102 on the tow vehicle 100. The first connector 160 provides electrical connection that allows the trailer 200 to take the feed from the tow vehicle 100 allowing the trailer to have taillights, turn signals, and brake lights that are in sync with the tow vehicle 100.

The first connector 160 also provides communication between a vehicle brake controller 112 and the HECU 240 by sending a brake signal 212 to the hydraulic pump 230 that triggers the trailer 200 to brake. The first connector 160 also provides communication between a vehicle battery signal 114 and the trailer battery signal 214, which connects to the trailer battery 202.

In some examples, the first connector 160 includes a first end 162*a* releasably connected to a complementary first vehicle connector 104 on the tow vehicle 100. The first connector 160 also includes a second end 162*b* releasably connected to a complementary first trailer connector 204. The first connector 160 may be any connector, such as, but not limited to, a 4-pin connector, a 5-pin connector, a 6-pin connector, or a 7-pin connector. Other connectors may also be used. In some examples, the 7-pin connector is a standard 7-pin connector having pins 1 through 7. The first vehicle connector 104 and the second end 162*b* of the first connector 160 have the following assigned pins 1-7:

TABLE 1

Tow Vehicle End: First Vehicle Connector 104
(and second end 162b of the first connector 160)

| Pin | Source | Destination | Color | Function |
|---|---|---|---|---|
| 1 | Chassis ground | Connector | White | GND |
| 2 | Brake controller (cab) | Connector | Blue | Trailer brakes |
| 3 | Tail lamp connector | Connector | Brown | Tail/running lights |
| 4 | Battery | Connector | Red | 12 V+ |
| 5 | Tail lamp connector | Connector | Yellow | Left stop/turn |
| 6 | Tail lamp connector | Connector | Dark green | Right stop/turn |
| 7 | Not applicable | Connector | Light green | Aux |

Referring to FIG. 2, Pin 1 of the first vehicle connector 104 outputs a signal from the chassis ground 110, Pin 1 outputs a signal from the vehicle brake controller 112, Pins 3, 5, and 6 output signal associated with the lighting 102, 102a-n, Pin 4 outputs a battery signal 114, and pin 7 is not used, but may function as an Auxiliary pin 116 or a backup lights 201 for the trailer.

In addition, the first trailer connector 204 and the first end 162a of the first connector 160 have the following pins 1-7:

TABLE 2

Trailer End: First Trailer Connect 204
(and the first end 162a of the first connector 160)

| Pin | Source | Destination | Color | Function |
|---|---|---|---|---|
| 1 | Connector | Trailer chassis ground | White | GND |
| 2 | Connector | Brake control module | Blue | Trailer brakes |
| 3 | Connector | Tail lamps | Brown | Tail/running lights |
| 4 | Connector | Trailer battery | Red | 12 V+ |
| 5 | Connector | Tail lamps | Yellow | Left stop/turn |
| 6 | Connector | Tail lamps | Dark green | Right stop/turn |
| 7 | Connector | Not applicable | Light green | Aux |

Pin 1 of the trailer connector 204 receives a signal from the first connector 160 and sends it to the trailer chassis ground 211, Pin 2 receives a signal from the first connector 160 and sends it to the HECU 240 of the trailer 200, Pins 3, 5, and 6 receive a signal from the first connector 160 and send it to the trailer lighting 201, Pin 4 is connected to a trailer battery 214, and pin 7 is not used, but functions as an Auxiliary pin 216. In some examples, Pin 7 may be used for backup lights of the trailer 200. Therefore, the trailer 200 receives a brake signal from the tow vehicle 100 and the HECU 240 of the trailer 200 executes a behavior 302-310 regardless whether the tow vehicle 100 is executing a similar behavior.

Figure 5A:
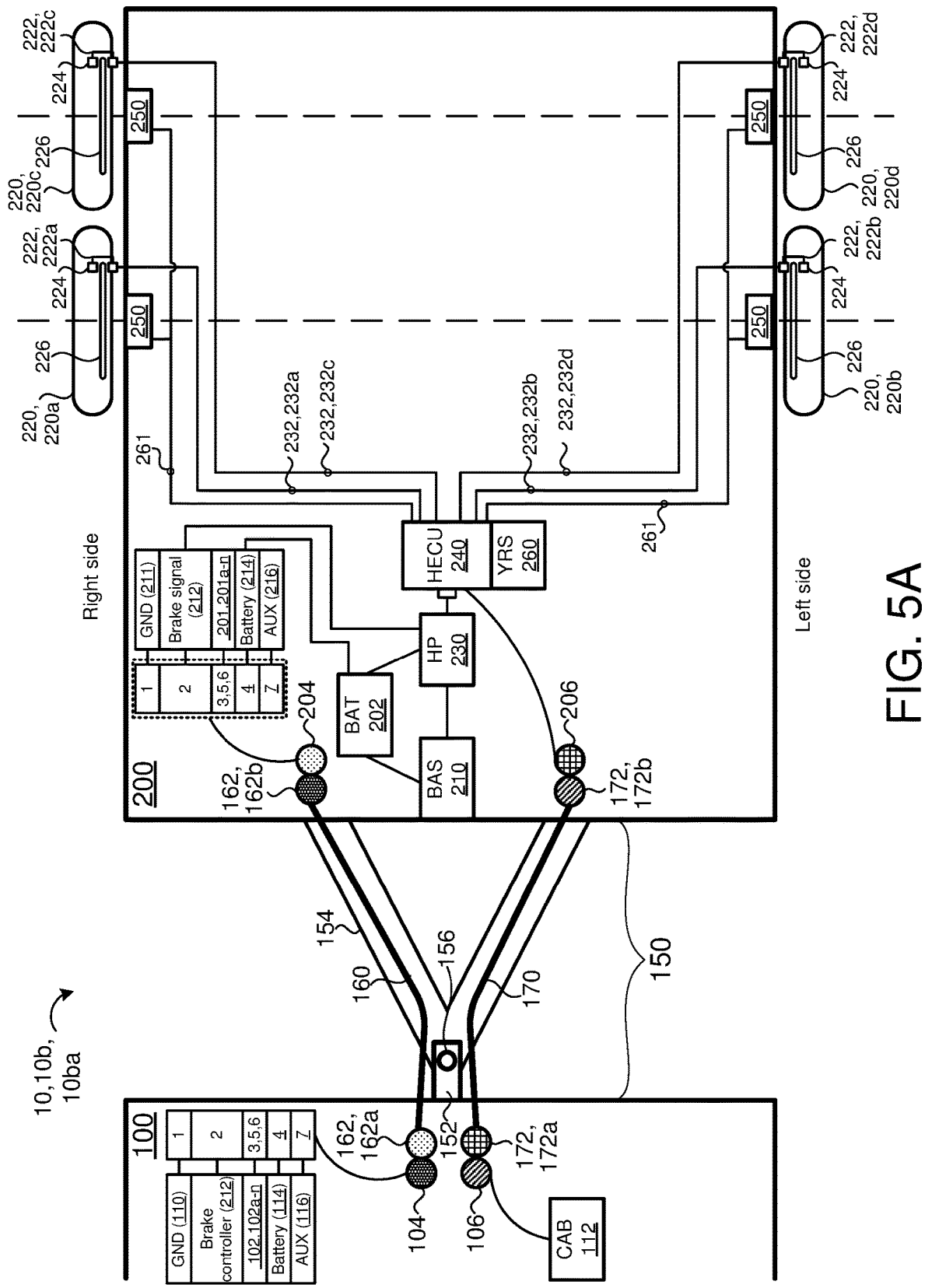
FIG. 5A is a schematic view of the exemplary tow system of FIG. 4 with the two connectors between a tow vehicle and a trailer.
Figure 5B:
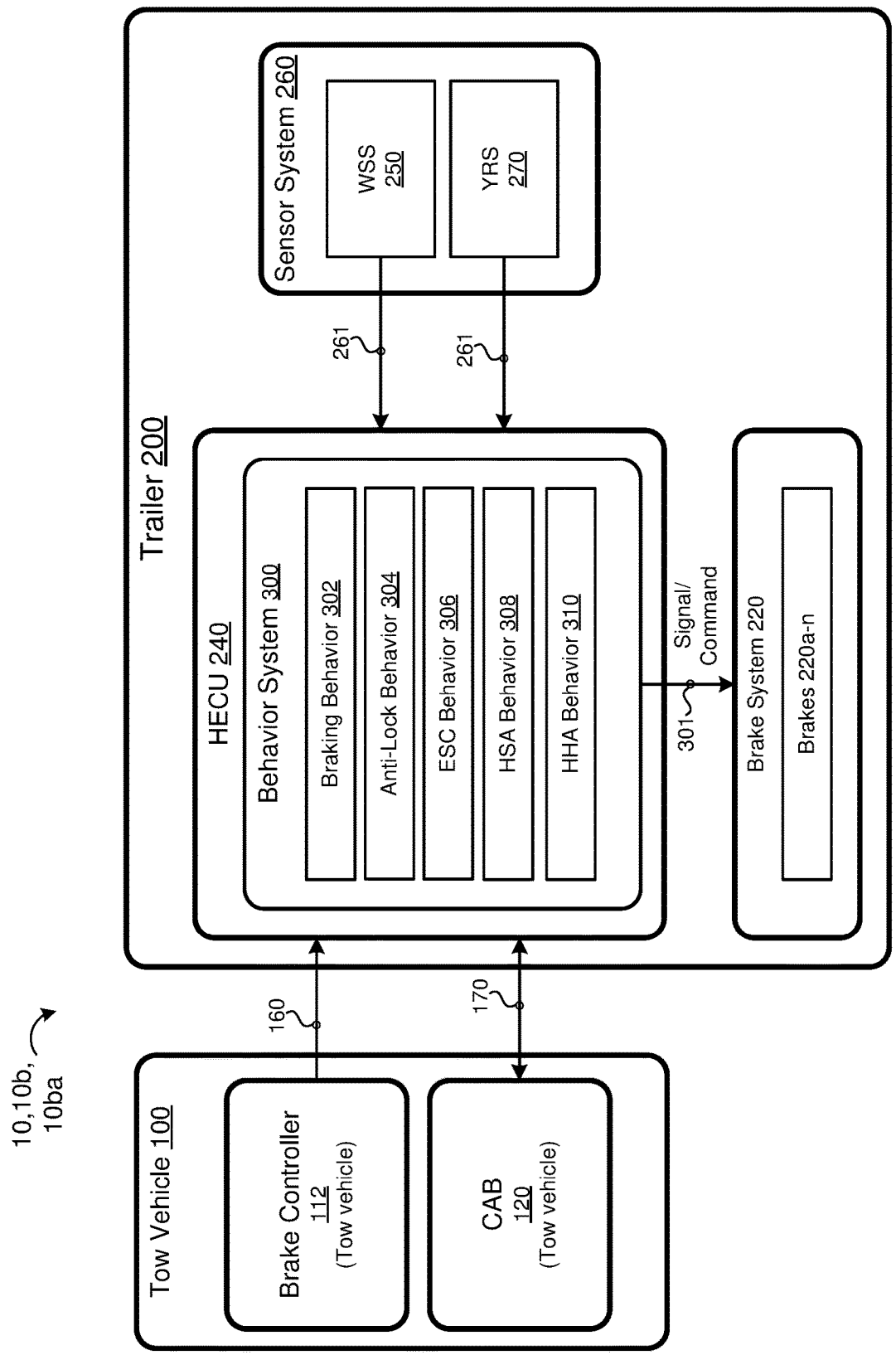
FIG. 5B is a schematic view of an electronic hydraulic and electronic control unit of the tow system of FIG. 5A.

Referring to FIGS. 4-5B, in some implementations, the towing system 10b includes the second connector 170 configured to link the brake system of the tow vehicle 100 and the brake system 222 of the trailer 200. The second connector 170 may be a vehicle bus configured to connect components between the tow vehicle 100 and the trailer 200. The vehicle bus may use a controller area network (CAN) protocol, or any other protocols. As such, the second connector 170 provides the sensor system 260 to send sensor data to the tow vehicle 100, where in some examples, the driver 20 may view. For examples, the TPMS may send the tow vehicle 100 a signal indicative of the tire pressure being low. In some examples, the brake system of the tow vehicle 100 and the brake system 22 of the trailer 200 are linked wirelessly.

The HECU 240 of the trailer 200 may communicate with a brake controller (CAB) 112 of the tow vehicle 100. This allows the CAB 112 and the HECU 240 to be synchronized, providing the driver 20 with better control over the tow system 10b by linking the brakes of the tow vehicle 100 with the brakes 222a-n of the trailer 200. Linking the brakes of the tow vehicle 100 to the brakes 222a-n of the trailer 200, enhances the ability of the tow system 10 to react faster when the driver 20 pushes the brake pedal 118 on the tow vehicle 100.

The second connector 170 may include two ends 172, a first end 172, 172a releasably connected to a second vehicle connector 106 and a second end 172, 172b releasably connected to a second trailer connector 206. Several types of connectors 170 may be used. In some examples, the first end 172a may include PINS 1-12 as described in Table 3 below:

TABLE 3

Tow Vehicle End
J3008

| Pin | Source | Destination | Color | Function |
|---|---|---|---|---|
| 1 | KL30 or KL15 | Connector | T.B.D. | Power |
| 2 | Vehicle CAN | Connector | T.B.D. | CAN+ H |
| 3 | Vehicle CAN | Connector | T.B.D. | CAN− L |
| 4 | Vehicle Infotainment | Connector | T.B.D. | PSI5+ Sensor |
| 5 | Vehicle Infotainment | Connector | T.B.D. | PSI5− Sensor |
| 6 | Chassis GND | Connector | T.B.D. | Ground |
| 7 | Brake Controller (Cab) | Connector | T.B.D. | Brake |
| 8 | Vehicle Infotainment | Connector | T.B.D. | Video GND/Shield |
| 9 | Vehicle Infotainment | Connector | T.B.D. | Video+ |
| 10 | Vehicle Infotainment | Connector | T.B.D. | Video− |
| 11 | T.B.D. | Connector | T.B.D. | N/C |
| 12 | T.B.D. | Connector | T.B.D. | N/C |

Similarly, the second end 172 may include PINS 1-12 as described in Table 4 below:

TABLE 4

Trailer End
J3008

| Pin | Source | Destination | Color | Function |
|---|---|---|---|---|
| 1 | Connector | Trailer Functions | T.B.D. | Power |
| 2 | Connector | Trailer CAN | T.B.D. | CAN+ H |
| 3 | Connector | Trailer CAN | T.B.D. | CAN− L |
| 4 | Connector | TPMS Controller | T.B.D. | PSI5+ Sensor |
| 5 | Connector | TPMS Controller | T.B.D. | PSI5− Sensor |
| 6 | Connector | Trailer Chassis GND | T.B.D. | Ground |
| 7 | Connector | ABS/ESC Control Module | T.B.D. | Brake |
| 8 | Connector | Trailer Cameras | T.B.D. | Video GND/Shield |
| 9 | Connector | Trailer Cameras | T.B.D. | Video+ |
| 10 | Connector | Trailer Cameras | T.B.D. | Video− |
| 11 | Connector | T.B.D. | T.B.D. | N/C |
| 12 | Connector | T.B.D. | T.B.D. | N/C |

Therefore, by linking the brakes of the tow system 10b, the driver 20 may have several advantages that include a better handle on the tow system 10b, a shorter time for the trailer 200 to brake after the driver 20 pushes the brake pedal 118, and provide the trailer 200 with ABS, ESC and other behavior that improve the driving experience of the driver 20. Linked brake systems would also enable the HHA via an electronic parking brake, triggered by the electronic parking brake of the tow vehicle 100.

Figure 6A:
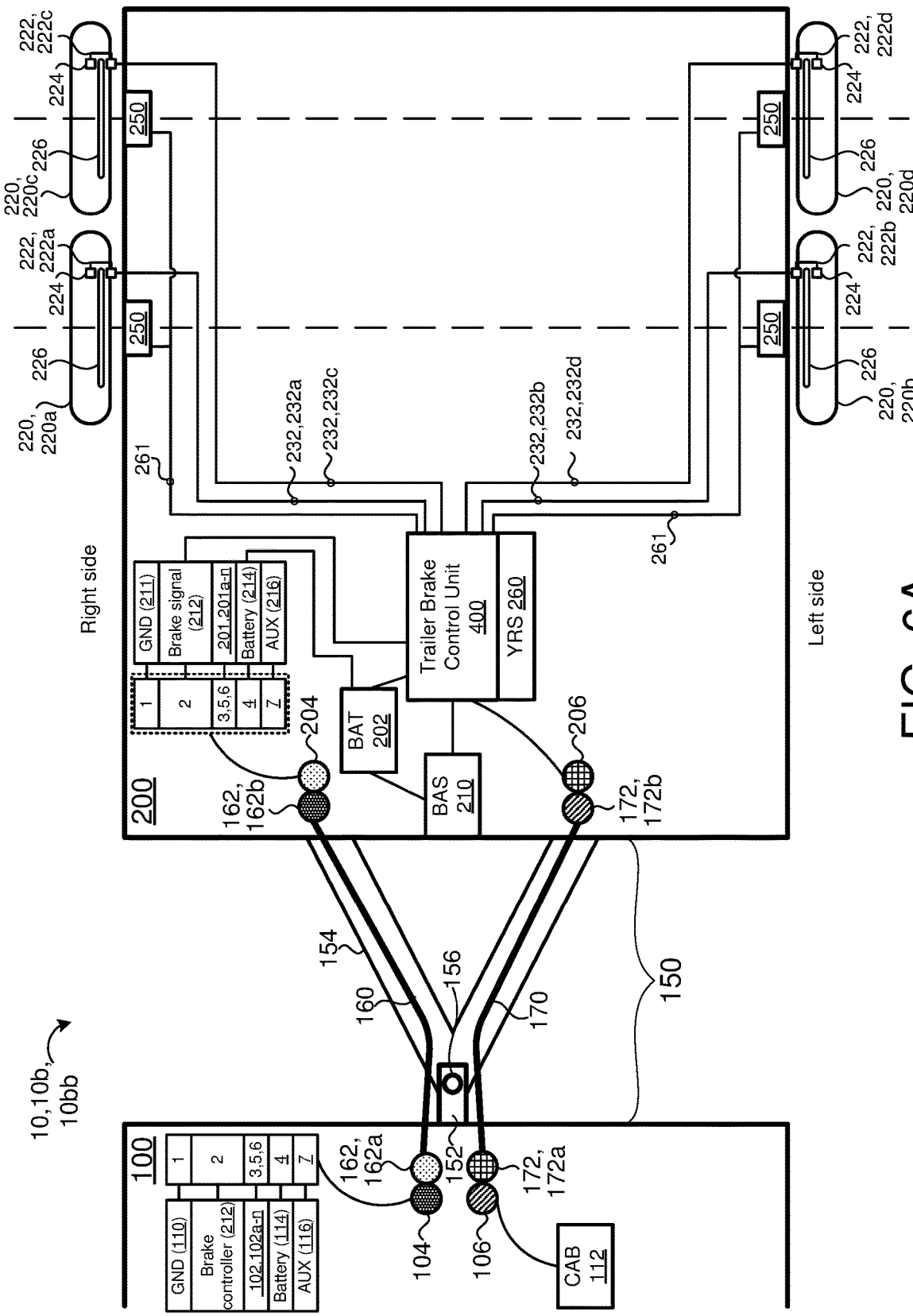
FIG. 6A is a schematic view of the exemplary tow system of FIG. 4 with the two connectors between a tow vehicle and a trailer.
Figure 6B:
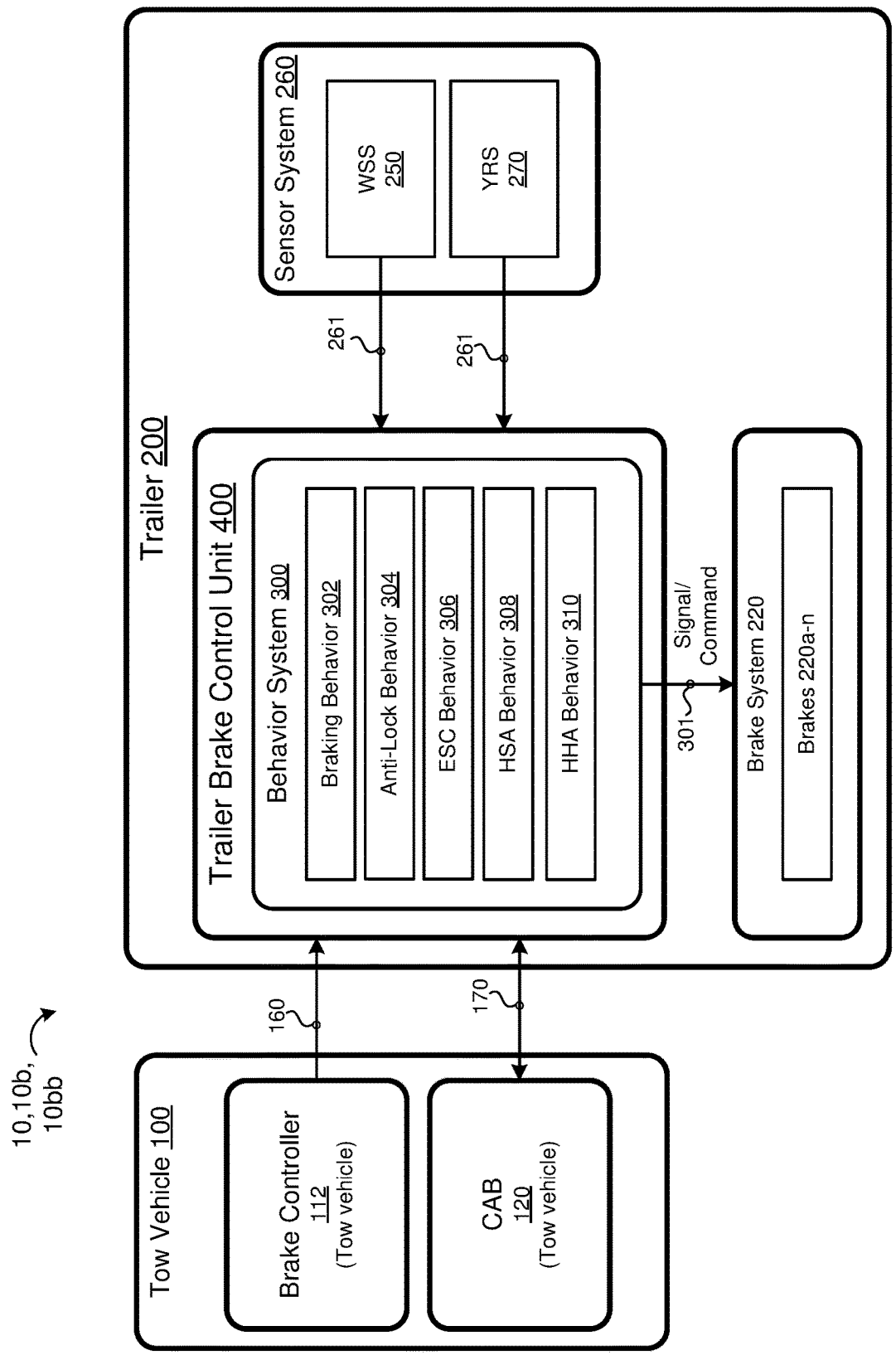
FIG. 6B is a schematic view of an electronic hydraulic and electronic control unit of the tow system of FIG. 6A.

Referring to FIGS. 4, 6A, and 6B, in some implementations, the towing system 10bb may be used instead of the towing system 10ba described in FIGS. 5A and 5B. As shown, the towing system 10bb includes a trailer brake control unit 400 that replaces the HP 230 and the HECU 240 of FIGS. 5A and 5B. All other aspects of the towing system 10bb work the same as the one described with respect to FIGS. 5A and 5B. The trailer brake control unit 400 is configured to generate its own hydraulic pressure with a simulator (e.g., a linear fast acting actuator). The trailer brake control unit 400 includes an actuator (not shown) that is electronically controlled, and therefore allows for a faster response time to a brake command 216. As such, the trailer brake control unit 400 is configured to allow for a shorter stopping distance due to its fast response time to the braking command 216. Since the trailer brake control unit 400 replaces the HP 230 and the HECU 240, it needs less space within the tow vehicle 100. Additionally, in some examples the trailer brake control unit 400 can actuate an emergency stop faster than other systems due to the electronically controlled actuators.

In some implementations, the trailer brake control unit 400 includes acceleration sensors (not shown), which eliminate the need for external acceleration sensors. Acceleration sensors are sensors that measure the acceleration of the tow vehicle 100.

In some implementations, the tow vehicle 100 includes a brake controller (not shown) that is similar to the trailer brake control unit 400 of the trailer 200. This makes communication between the controllers faster and easier to sync which leads to the two controllers acting as one controller unit.

The trailer brake control unit 400 may include an electronic parking brake (EPB) that is not shown. In cases where the tow vehicle 100 also includes an EPB or can send the trailer brake control unit 400 a signal to activate the trailer EPB, then parking the tow vehicle 100 and the trailer 200 becomes safer, especially on an incline because instead of using the one axle from the tow vehicle 100 to park, the system 10b is also using the axle(s) from the trailer 200. In some examples, the trailer 200 includes two or more axles, therefore the system 10b would be held by at least two axles.

FIG. 7 is a schematic view of an exemplary arrangement of operations for controlling a trailer brake system of a trailer 200. At block 704, the method 700 includes receiving, at a brake control unit 400 supported by the trailer 200, sensor data 261 from one or more sensors 250, 270 of a sensor system 260. Each sensor 250, 270 is associated with a wheel 220 of the trailer 200. In some examples, the brake control unit 400 includes a hydraulic pump 230 and a hydraulic and electric control unit 230. At block 704, the method 700 includes receiving, at the trailer brake control unit 400, a brake signal 212 from a tow vehicle 100 configured to tow the trailer 200. The brake signal 212 is indicative of a driver 20 of the tow vehicle 100 pressing a brake pedal 118 of the tow vehicle 100. The brake signal 216 may be received from a first connector 160 connecting the tow vehicle 100 and the trailer 200. At block 706, the method 700 includes executing, by the brake control unit 400, a behavior 302-310 from a behavior system 300 based on the sensor data 261. The behavior 302-310 causing the brake control unit 400 to adjust a hydraulic pressure to each wheel 220 of the trailer 200.

In some implementations, the method 700 includes receiving, at the brake control unit 400, tow vehicle data (through a second connector 170), and transmitting, from the brake control unit to the tow vehicle, trailer data (through the second connector 170). Receiving tow vehicle data and transmitting trailer data causes the tow vehicle and the trailer to act as a braking system, e.g., pressing the brake pedal 118 of the tow vehicle 100 results in the same behavior executed on the tow vehicle 100 and the trailer 200. In some examples, the behavior includes one or more of a braking behavior 302, an anti-lock behavior 304, an electronic stability control behavior 306, a hill-start assist behavior 308, and a hill-hold assist behavior 310. Each behavior 302-310 determines a pressure value applied to each brake 222. In some example, the sensor data 261 received from one or more sensors 250, 270 includes at least one of speed sensor data associated with each wheel 220, wheel travel data associated with each wheel 220, trailer distance from a surface.

In some implementations, executing the behavior 302-310 based on the sensor data 261, includes: determining for each brake 222, a hydraulic pressure based on the sensor data 261 and the brake signal 212, and applying hydraulic pressure by way of brake lines 232 to the brake 222 associated with each wheel, based on the hydraulic pressure.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks.

However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A trailer brake system comprising:
a sensor system supported by a trailer, the sensor system comprising at least one wheel speed sensor associated with each wheel of the trailer;
a brake control unit supported by the trailer and in communication with a tow vehicle configured to tow the trailer, the brake control unit configured to:
receive sensor data from the sensor system;
receive a brake signal from the tow vehicle indicative of a driver pressing a brake pedal of the tow vehicle;
determine, for each brake, a hydraulic pressure based on the sensor data and the brake signal; and
apply pressure by way of brake lines to the brake associated with each wheel, based on the hydraulic pressure;
a first connector having a first end releasably connected to the tow vehicle and a second end releasably connected to the trailer, the first connector transmitting the brake signal to the brake control unit; and
a second connector having a first end releasably connected to the tow vehicle and a second end releasably connected to the trailer, the second connector configured to link a brake system of the tow vehicle and the brake control unit of the trailer, causing the brake system of the tow vehicle and the brake control unit to execute the same behaviors.

2. The trailer brake system of claim 1, wherein the brake control unit executes a behavior before applying pressure by way of the brake lines to the brake associated with each wheel, the behavior determining a pressure value applied to each brake.

3. The trailer brake system of claim 2, wherein the behavior includes one or more of a braking behavior, an anti-lock behavior, an electronic stability control behavior, a hill-start assist behavior, and a hill-hold assist behavior.

4. The trailer brake system of claim 1, wherein the sensor data received from the sensor system comprises at least one of speed sensor data associated with each wheel, wheel travel data associated with each wheel, trailer distance from a surface.

5. The trailer brake system of claim 1, wherein the brake control unit comprises:

a hydraulic pump configured to apply pressure by way of the brake line to the brakes associated with each wheel; and a hydraulic and electric control unit in communication with the hydraulic pump and the sensor system and having a computing processor processing data received from the sensor system, the hydraulic and electric control unit determining the hydraulic pressure for each brake.

6. A method for controlling a trailer brake system, the method comprising:

receiving, at a brake control unit supported by a trailer, sensor data from one or more sensors, each sensor associated with a wheel of the trailer;

receiving, at the brake control unit, a brake signal from a tow vehicle configured to tow the trailer, the brake signal indicative of a driver of the tow vehicle pressing a brake pedal of the tow vehicle;

receiving, at the brake control unit, tow vehicle data;

transmitting, from the brake control unit to the tow vehicle, trailer data; wherein receiving tow vehicle data and transmitting trailer data causes the tow vehicle and the trailer to act as a braking system; and executing, by the brake control unit, a behavior based on the sensor data, the behavior causing the brake control unit to adjust a hydraulic pressure to each wheel of the trailer.

7. The method of claim 6, wherein the behavior includes one or more of a braking behavior, an anti-lock behavior, an electronic stability control behavior, a hill-start assist behavior, and a hill-hold assist behavior, each behavior determining a pressure value applied to each brake.

8. The method of claim 6, wherein the sensor data received from one or more sensors comprises at least one of speed sensor data associated with each wheel, wheel travel data associated with each wheel, trailer distance from a surface.

9. The method of claim 6, wherein executing the behavior based on the sensor data, comprises:

determining for each brake, a hydraulic pressure based on the sensor data and the brake signal; and applying hydraulic pressure by way of brake lines to the brake associated with each wheel, based on the hydraulic pressure.

10. A trailer brake system comprising:

a sensor system disposed on a trailer having wheels, the sensor system comprising at least one wheel speed sensor associated with a wheel of the trailer;

a hydraulic pump supported by the trailer and configured to apply pressure by way of a brake line to a brake associated with each one of the wheels when receiving a brake signal from a tow vehicle in communication with the hydraulic pump;

a hydraulic and electric control unit in communication with the hydraulic pump and the sensor system and having a computing processor processing data received from the sensor system, the hydraulic and electric control unit determining a hydraulic pressure applied to each brake based on data received from the sensor system when the hydraulic pump receives the brake signal;

a first connector having a first end releasably connected to the tow vehicle and a second end releasably connected to the trailer; the first connector transmitting a brake signal to the trailer; and a second connector having a first end releasably connected to the tow vehicle and a second end releasably connected to the trailer, the second connector configured to link a brake system of the tow vehicle and the hydraulic and electric control unit of the trailer.

11. The trailer brake system of claim 10, wherein the hydraulic pump receives the brake signal from the tow vehicle causing the hydraulic pump to apply pressure by way of the brake line to a brake associated with each one of the wheels.

12. The trailer brake system of claim 11, wherein the hydraulic and electric control unit executes a behavior configured to determine the hydraulic pressure applied to each brake when the hydraulic pump applies pressure by way of brake line to a brake associated with each one of the wheels.

13. The trailer brake system of claim 10, wherein the data received from the sensor system comprises at least one of speed sensor data associated with each wheel, wheel travel data associated with each wheel, trailer distance from a surface.

14. The trailer brake system of claim 10, wherein the hydraulic and electric control unit is configured to:

receive data from the sensor system indicative of a wheel speed associated with each wheel; and execute a behavior based on the wheel speed of each wheel, the behavior being one of a braking behavior, an anti-lock behavior, an electronic stability control behavior, a hill start assist behavior, or a hill hold assist behavior.

* * * * *